UNITED STATES PATENT OFFICE 2,397,667

ACYL-GUANYLUREAS AND THEIR PREPARATION

Donald W. Kaiser and Jack T. Thurston, Riverside, Conn., assignors to American Cyanamid Company, New York, N. Y., a corporation of Maine No Drawing. Application October 28, 1942, Serial No. 463,666

9 Claims. (Cl. 260—553)

This invention relates to new organic compounds and to their preparation.

In our copending application Serial No. 445,206, filed May 30, 1942, we have disclosed that acyl-dicyandiamides and salts thereof, a new class of compounds, may be prepared by the method described and claimed therein. The reaction whereby these new acyl dicyandiamides are prepared is brought about by simply mixing at a temperature not in excess of about 60° C. dicyandiamide with a desired acylating agent, such as the acid halides or anhydrides of aliphatic, alicyclic, or aromatic carboxylic acids, and a water-soluble alkali metal or alkaline earth metal oxide or hydroxide in the presence of water. The amount of water employed in the reaction mixture should be comparatively small and in some cases the water present in the reagents is sufficient for the purpose. In order to conduct the reaction in a fluid medium the water may be supplemented with other solvents preferably non-hydroxylated and also preferably miscible with water. Non-hydroxylated solvents are preferred since hydroxylated solvents such as alcohol tend to react with the acyl halides. Of these solvents, dioxane and acetone have been used with good results. Ordinarily only enough solvent, including water, is employed to solubilize the reactants. We have now discovered that acyl-guanylureas and salts of acyl-guanylureas may be prepared by treatment of the aforesaid acyl-dicyandiamides with acids under the conditions to be presently described. The present invention includes, therefore, these acyl-guanylureas and salts thereof as new compounds and the method of preparing the same.

The acyl-guanylureas of the present invention may be represented by the following general formula

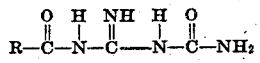

in which R is an aliphatic, alicyclic or aromatic radical having at least 3 carbon atoms. The chemical reactivity of these compounds leads us to believe that they also exist in a tautomeric form having the formula

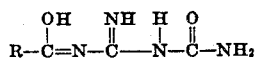

It is likely, therefore, that the product obtained by us from our reaction includes both tautomers in equilibrium proportions with the percentage of the former predominating. These compounds may also theoretically exist in other isomeric forms in which the carbamylguanyl residue,

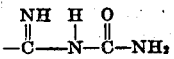

may have a variety of tautomeric configurations. Accordingly, the acyl-guanylureas of the present invention may be more accurately represented by the formula R·Y, in which R is an aliphatic, cycloaliphatic or aromatic radical, as above, and Y is an acyl-guanylurea radical which in one of its tautomeric forms has the formula

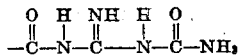

The acyl-guanylureas may be prepared by treating one of the acyl-dicyandiamides described in our above named application with a slight molecular excess of an acid having a dissociation constant of at least $1 \times 10^{-4}$. A wide variety of organic and inorganic acids may be employed to hydrolyze the acyl-dicyandiamides to the corresponding acyl-guanylureas. Among the more common acids which may be employed by us for the synthesis of our new compounds may be mentioned hydrochloric, sulfuric, sulfurous, phosphoric, nitric, formic, phthalic, fumaric, maleic, chloracetic, toluenesulfonic, sulfamic, dichloracetic, dibromacetic, nitrobenzoic, orthotoluic and other acids of like character. As will be noted in the specific examples which illustrate our invention the concentration of the acid may vary considerably; for example, from 2% to 37% hydrochloric acid having been found to be suitable. The amount of acid may also vary but should be enough to satisfy all neutralizable groups present in the reaction mixture and still provide a slight excess of free acid. Ordinarily we use from 1.1 to 1.5 mols of acid for each equivalent of the acylated dicyandiamide.

The temperature at which the reaction is carried out is also subject to considerable variation and as seen by the specific examples may range from room temperature, or lower, to the temperature of the refluxing mixture; i. e., about 100° C. or more. At the higher temperatures the speed of the reaction is increased and in most cases is complete in 5 to 10 minutes.

The acyl-guanylureas are recovered from the reaction mixture either in the form of their acid salt or as the free base. These guanylurea salts are moderately water-soluble but will precipitate out of solution when their concentration in the reaction mixture becomes sufficiently high and particularly upon cooling the solution. The product may be purified by washing with water and, if desired, recrystallized from hot water or polar type organic solvents such as methyl alcohol, the monoethyl ether of ethylene glycol, formamide, dioxane, etc. The free aromatic and alicyclic acyl-guanylureas are water-insoluble and may be precipitated from aqueous solutions of their acid salts by neutralization with a base such as ammonia, sodium hydroxide, etc. The aliphatic acyl-guanylureas in which the aliphatic radical, R in the general formula above, has at least 3 carbon atoms are also sufficiently water-insoluble to be precipitated from aqueous solutions by neutralization of their acid salts with base. The lower aliphatic acyl-guanylureas are, however, extremely water-soluble and can not be recovered in this way. Aqueous solutions of the hydrochloride salt of acetyl-guanylurea, for example, when treated with ammonia or other alkali will precipitate aceto-guanide from solution instead of the free acetyl-guanylurea.

Any of the acylated dicyandiamides disclosed and claimed in our before-mentioned application may be hydrolyzed to yield the acyl-guanylureas of the present invention. Among those which may be specifically mentioned as being hydrolyzable to guanylureas are butyryldicyandiamide, caproyldicyandiamide, lauryldicyandiamide, stearyldicyandiamide, palmityldicyandiamide, α-bromcapropyldicyandiamide, 9,10-dichlorstearyldicyandiamide, δ-nitrovaleryldicyandiamide, β-N-acetylbutylaminopropionyldicyandiamide, ω-hydroxydecanoyldicyandiamide, ω-carboxyvaleryldicyandiamide, adipyldicyandiamide, sebacyldicyandiamide, succinyldicyandiamide, phthaloyldicyandiamide, hexahydrophthaloyldicyandiamide, benzoyldicyandiamide, p-aminobenzoyldicyandiamide, o-aminobenzoyldicyandiamide, p-nitrobenzoyldicyandiamide, o-nitrobenzoyldicyandiamide, o-carboxybenzoyldicyandiamide, p-hydroxybenzoyldicyandiamide, m-hydroxyphenoxyacetyldicyandiamide, α-naphthoyldicyandiamide, β-5-sulfonaphthoyldicyandiamide, cyclohexylacetyldicyandiamide, hexahydrobenzoyldicyandiamide, cyclopentylacetyldicyandiamide, ω-carboxypelargonyldicyandiamide and others.

Our compounds are for the most part white crystalline solids moderately soluble in water and easily soluble in dilute solutions of alkalies. They decompose without melting at moderately high temperatres, usually within the range of 120 to 220° C. When treated with a few drops of aqueous copper sulfate followed by a small amount of aqueous sodium hydroxide or ammonia they give the characteristic pink-violet coloration of guanylureas. The compounds are useful for a variety of purposes serving principally as intermediates in the preparation of guanides, resins, pharmaceuticals and dyestuffs.

Our invention will now be illustrated in greater detail by means of the following specific examples in which the preparation of typical acyl-guanylureas is described. It should be understood that our invention is not to be limited to these particular examples or the particular conditions employed therein, since as stated before, the invention is of wide scope and is to be construed as broadly as the appended claims permit.

EXAMPLE 1

*Benzoyl-guanylurea*

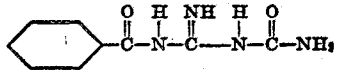

63.5 g. of 95% sodium hydroxide dissolved in 125 cc. of water were placed in a three-necked flask provided with a stirrer, dropping funnel, and thermometer. 63 g. of pulverized dicyandiamide was added to the sodium hydroxide solution with stirring until dissolved. 150 cc. of acetone was then added. The resulting double layer was agitated thoroughly and the temperature kept between 20°–25° C. while 70.25 g. of benzoyl chloride was added in the course of ½ hour. During this time a solid separated but addition of water after the reaction was complete gave a clear, very light yellow solution. Acidification of the solution with acetic acid precipitated a colorless solid which was filtered, washed well with water and allowed to air dry. The product, benzoyldicyandiamide,

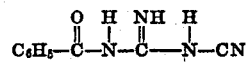

was recovered with a yield of 71.5%.

188 parts by weight (1.0 mol) of benzoyldicyandiamide, 400 parts by weight of water and 120 parts by weight (1.2 mols) of concentrated hydrochloric acid were mixed in a reaction vessel fitted with a refluxing condenser and heated to refluxing temperature. Complete solution of the reaction mixture occurred but within 5 minutes so much solid reaction product (benzoylguanylurea hydrochloride) had deposited that 500 parts by weight of water was added. The heating was continued for a short time, the mixture was then cooled and made alkaline with ammonia. The resulting solid cake of benzoylguanylurea was broken up and filtered, washed with water and dried in an oven at 90° C. A recovery representing a yield of 92.7% was obtained. The colorless product obtained decomposed when heated at 186–189° C. Since benzoyldicyandiamide has approximately the same decomposition temperature a quantity of the benzoyl-guanylurea product was mixed with benzoyldicyandiamide and the melting point of the mixture taken. The mixed product was found to decompose at 164° C. thus showing that the product obtained was not benzoyldicyandiamide. On recrystallization from butanol colorless plate-like crystals were obtained which decomposed at 187–188° C. and gave a pink-violet guanlyurea test with CuSO₄ and NaOH. Chemical analysis of the material checked well with the theoretical values for benzoyl-guanylurea.

EXAMPLE 2

*Caproyl-guanylurea*

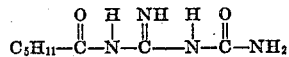

A solution of 84.4 g. of 95% sodium hydroxide in 300 cc. of water was prepared and divided into two equal portions. One part was placed in a three-necked flask equipped with a stirrer, thermometer and two dropping funnels. 126 g. of dicyandiamide and 300 cc. of acetone were added to the caustic soda solution in the flask. The mixture in the flask was stirred and maintained at 20° C. while the second portion of the alkali solution was added simultaneously with 134.5 g. of caproyl chloride. After the addition was completed the reaction mixture was diluted with water and acidified with acetic acid whereby a colorless solid was precipitated. The material was filtered, and washed well with water. When dry the crystals melted at 171-173° C. Crystallization of 103 g. of the product, caproyl dicyandiamide, from 95% ethyl alcohol gave 76 g. of beautiful, large plate-like crystals which melted at 179-180° C.

34.4 parts by weight (0.188 mol) caproyldicyandiamide was added to 50 parts by weight of water and 24 parts by weight (0.24 mol) of concentrated hydrochloric acid. The mixture was heated to refluxing temperature and the clear solution refluxed for several minutes. On cooling an almost solid cake separated from the solution. After making the reaction mixture alkaline with ammonium hydroxide the solid was filtered, washed with water and allowed to dry. The product was dissolved in hot water and recrystallized twice, yielding a product having a decomposition point of 172-173° C. Chemical analysis checked closely with the theoretical values for caproyl-guanylurea.

EXAMPLE 3

*Lauryl-guanylurea*

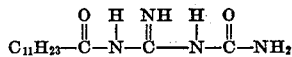

To a solution containing 66 g. of 85% potassium hydroxide in 200 cc. of water was added 126 g. of dicyandiamide and 300 cc. of acetone. The mixture was cooled to 20° C. and stirred while 219 g. of lauroyl chloride was slowly added simultaneously with another solution of 66 g. of potassium hydroxide in 100 cc. of water. The mixture was then acidified with acetic acid diluted with water and the precipitated product filtered as dry as possible. The damp solid was dissolved in hot acetone and a little Cellosolve, decolorizing carbon was added and the material filtered. On cooling, glistening, colorless plates separated. A portion of these crystals were dissolved in methyl ethyl ketone and recrystallized to give beautiful plates which melted at 166-167° C.

40 parts by weight (0.15 mol) of lauryldicyandiamide was added to a mixture of 75 parts by weight of water and 39 parts by weight of 95% ethyl alcohol and 20 parts by weight (0.2 mol) concentrated hydrochloric acid. Upon heating the reaction mixture to refluxing temperature complete solution of the lauryldicyandiamide was effected. After refluxing the mixture for 10 minutes the clear solution was cooled in an ice bath whereupon an almost solid cake of crystalline hydrochloride salt was obtained. The mixture was made alkaline with ammonium hydroxide, the solid filtered, washed with water and allowed to dry. The crude reaction product thus obtained was recrystallized twice from ethyl alcohol whereupon a crystalline material having a decomposition temperature of 132-133° C. was obtained. Chemical analysis of the product checked closely with the theoretical values for lauryl-guanylurea as will be noted from the following:

| | Analysis | | |
|---|---|---|---|
| | Percent C | Percent H | Percent N |
| Calculated for $C_{14}H_{28}N_4O_2$ | 59.15 | 9.86 | 19.71 |
| Found | 59.35 | 9.84 | 19.64 |
| | 59.64 | 9.92 | 19.79 |

EXAMPLE 4

*p-Nitrobenzoyl-guanylurea*

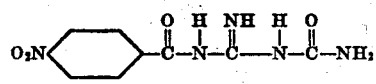

18.5 g. of p-nitrobenzoyl chloride was dissolved in 50 cc. of acetone and added to a cold mixture of 20 cc. of 50% sodium hydroxide, 10 g. of dicyandiamide, 50 cc. of acetone and 20 cc. of water. The temperature was kept at 5-10° C. and the addition was complete in ½ hour. The mixture was then diluted with water, neutralized, and filtered. The material was then purified by dissolving in an excess of potassium hydroxide solution and cooling, whereupon the potassium salt of p-nitrobenzoyl dicyandiamide was precipitated. The acyl dicyandiamide was recovered from its salt by dissolving in water and neutralizing with hydrochloric acid.

10 parts by weight p-nitrobenzoyldicyandiamide was placed in a flask fitted with a reflux condenser and heated for one hour with 100 parts of 5% hydrochloric acid. The solution was then cooled and carefully neutralized with ammonium hydroxide. The resulting precipitate was recovered by filtration, dissolved in iso-propyl alcohol, in which it was very slightly soluble, and recrystallized. The purified product, p-nitrobenzoyl-guanylurea, was recovered as a white micro-crystalline powder. Upon heating, a sample of the purified material decomposed at 207° C. On analysis it was found to check closely with the theoretical analytical values for p-nitrobenzoylguanylurea.

EXAMPLE 5

*o-Carboxybenzoyl-guanylurea*

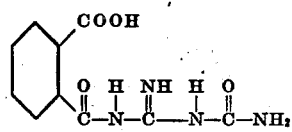

10 parts by weight of o-carboxybenzoyldicyandiamide was allowed to stand with 20 parts by weight of 10% hydrochloric acid for several hours at room temperature. The white crystalline material which formed on standing was the hydrochloride salt of o-carboxybenzoyl-guanylurea. The o-carboxybenzoyl-guanylurea was isolated as such by dissolving the hydrochloride salt in water, neutralizing the solution with ammonium hydroxide and then acidifying with hydrochloric acid to a pH of 3.0. On standing, white crystals of o-carboxybenzoyl-guanylurea formed. The product was insoluble in methanol, soluble in dilute acid but precipitated by an excess. On heating, a sample of the purified crystals decomposed at 143-144° C. Chemical analysis of the product for nitrogen gave analytical values which checked closely with those for o-carboxybenzoyl-guanylurea.

The hydrochloride salt of o-carboxybenzoyl-guanylurea was also prepared by allowing a quantity of o-carboxybenzoyldicyandiamide to stand at room temperature with a chemical equivalent of concentrated hydrochloric acid. The precipitated crystalline material was treated to recover o-carboxybenzoyl-guanylurea by neutralization with ammonium hydroxide and acidification to a pH of 3.0 as described above.

EXAMPLE 6

*Adipyl-diguanylurea*

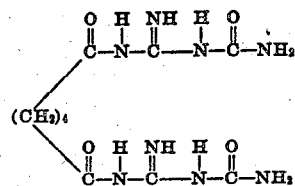

10 g. of adipyl-bis-dicyandiamide was slowly added to 20 cc. of concentrated hydrochloric acid with cooling to keep the temperature at 45° C. The mixture was stirred for ½ hour further during which time a smooth paste was formed. The paste was then diluted with 400 cc. of warm water and the solution filtered to remove traces of an insoluble material. The solution was cooled and carefully neutralized with caustic alkali to a pH of about 5.0. A white micro-crystalline precipitate of adipyl-diguanylurea was formed. The product was filtered, washed and vacuum dried. On heating, a sample decomposed at 178–180° C.

EXAMPLE 7

*p-Hydroxybenzoyl-guanylurea*

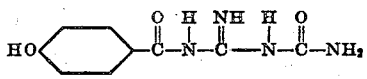

10 parts by weight of p-hydroxybenzoyldicyandiamide was boiled for 5 minutes with an excess of 5% hydrochloric acid. The acyl-dicyandiamide readily dissolved to give a clear solution. On cooling the hydrochloride of p-hydroxybenzoyl-guanylurea precipitated from the solution. Free p-hydroxybenzoyl-guanylurea was recovered by dilution of the above crystalline hydrochloride suspension with water followed by careful addition of dilute sodium hydroxide until a pH of about 5 was reached. The precipitated free p-hydroxybenzoyl-guanylurea was a cream-colored crystalline solid which decomposed at 160° C.

EXAMPLE 8

*m-Hydroxyphenoxyacetyl-guanylurea*

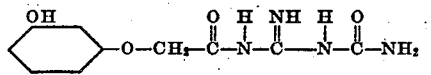

20 parts by weight of m-hydroxyphenoxyacetyldicyandiamide was boiled for 3 to 4 minutes with an excess of 10% hydrochloric acid. The acyldicyandiamide dissolved readily. After filtering a trace of gum-like material from the heated liquid it was cooled whereupon the hydrochloride salt of m-hydroxyphenoxyacetyl-guanylurea was precipitated. The salt decomposed when heated at 195–197° C. The free base was recovered from the hydrochloride as a white crystalline solid by carefully neutralizing the solution of the salt with dilute ammonium hydroxide. The precipitated product of m-hydroxyphenoxyacetyl-guanylurea decomposed when heated at 176–178° C. and gave a violet color with copper in an alkaline solution.

EXAMPLE 9

*p-Aminobenzoyl-guanylurea*

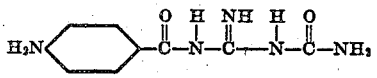

20 parts by weight of p-aminobenzoyldicyandiamide obtained by reduction of p-nitrobenzoyldicyandiamide with sodium sulfide was treated with 200 parts by weight of 2% hydrochloric acid at room temperature for one hour. The insoluble matter was filtered and the solution neutralized with dilute ammonia to a pH of about 5.0. The precipitate of the p-aminobenzoyl-guanylurea was boiled for a short time with a slight excess of 10% hydrochloric acid to insure complete conversion of the p-aminobenzoyldicyandiamide to p-aminobenzoyl-guanylurea. The latter product was recovered by filtering the precipitate obtained upon neutralizing the solution with ammonium hydroxide as before. The p-aminobenzoyl-guanylurea thus obtained had a faintly yellow color and decomposed when heated at 170–175° C. Upon recrystallization from a methanol-water mixture a white product was obtained which decomposed at 178–180° C. The material gave the guanylurea pink coloration with CuSO$_4$ in alkali.

EXAMPLE 10

*n-Butyryl-guanylurea*

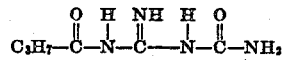

To a solution of 80 parts by weight (0.80 mol) of concentrated hydrochloric acid in 500 parts of water was added 100 parts by weight (0.65 mol) of n-butyryldicyandiamide. The mixture was heated to reflux and the resulting solution cooled in an ice bath. A slight excess of ammonium hydroxide was added and the precipitated colorless solid was filtered, washed with a little water and allowed to dry. Decomposition occurred at 115–118° C. The yield was 92.5% of the theoretical. The solid was very soluble in hot water, methanol, and isopropanol. Purification by dissolving the material in hot isopropanol and diluting the solution with a small quantity of petroleum ether gave an amorphous appearing solid which decomposed at 124–125° C. The product gave a very good guanylurea test when treated with copper sulfate solution and sodium hydroxide.

EXAMPLE 11

*Benzoyl-guanylurea p-toluenesulfonate*

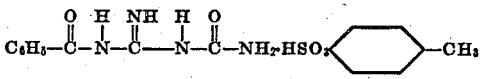

A mixture consisting of 37.6 g. (0.20 mol) of benzoyldicyandiamide, 40.0 g. (0.21 mol) of p-toluenesulfonic acid monohydrate, and 250 cc. of water was placed in a flask and heated over a free flame until solution occurred. Solid soon commenced to separate from the hot solution, and after cooling in an ice bath the colorless product was filtered, washed with water and allowed to dry. A yield of 68 g. (90%) of material decomposing at 184–186° C. was obtained. Crystallization from hot water gave colorless needles of benzoylguanylurea p-toluenesulfonate decomposing at 185–186° C.

A suspension of 37.8 g. (0.10 mol) of the salt in 250 cc. of water was cooled and made alkaline with ammonium hydroxide solution. The mixture was stirred a short time before filtering the free benzoyl-guanylurea. The solid was washed with water and after drying weighed 20.0 g. which represented a 97% conversion. Decomposition occurred at 187–188° C. when a sample of the product was heated. When mixed with a known sample of benzoyl-guanylurea having the same

EXAMPLE 12

Benzoyl-guanylurea chloroacetate

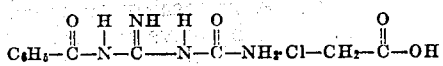

A mixture of 37.6 g. (0.20 mol) of benzoyldicyandiamide, 23.6 g. (0.25 mol) of monochloroacetic acid, and 150 cc. of water was heated over a free flame until a clear solution resulted. The hot solution was cooled in an ice bath and the nearly solid cake of product broken up, filtered and allowed to dry. The yield of the benzoyl-guanylurea chloroacetate salt was 59 g. or 98.5% of the theoretical. Decomposition occurred at 155-157° C. when a sample was heated. Crystallization from hot water gave amorphous appearing colorless solid which decomposed at 156-157° C.

For conversion to the free base 30.0 g. (0.10 mol) of the salt was suspended in 300 cc. of water and excess ammonium hydroxide added. No appreciable change occurred immediately due to the insolubility of the salt in the cold. The mixture was stirred 15 minutes, the solid filtered, washed with concentrated ammonia, and then with acetone which removed a small quantity of unconverted salt. The yield of free base was 18.0 g. or 87.5% of the theoretical. Decomposition occurred at 186-187° C. and fusion with a known sample of benzoyl-guanylurea gave no depression of the decomposition temperature.

EXAMPLE 13

Benzoyl-guanylurea nitrate

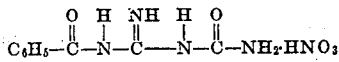

After diluting 22.5 g. (0.25 mol) of 70% nitric acid with 150 cc. of water, 37.6 g. (0.20 mol) of benzoyldicyandiamide was added and the mixture heated to boiling. The resulting clear solution was chilled in an ice bath, the separated solid filtered, washed with water and acetone and allowed to dry. The benzoyl-guanylurea nitrate salt weighed 48 g. (83.2% yield) and decomposed at 179-180° C.

Excess ammonium hydroxide was added to a suspension of 28.9 g. (0.10 mol) of the salt in 250 cc. of water. After stirring a short time, the benzoyl-guanylurea was filtered, washed with water and air dried. The yield of free base, decomposing at 186-188° C. was 19.8 g., representing a 96% conversion.

EXAMPLE 14

Benzoyl-guanylurea formate

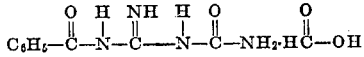

A mixture consisting of 37.6 g. (0.20 mol) of benzoyldicyandiamide, 13.2 g. (0.25 mol) of 87% formic acid, 150 cc. of water, and 50 cc. of Cellosolve was heated until a clear solution resulted. After cooling in an ice bath, the amorphous, colorless solid was filtered, washed with a small quantity of water, and air dried. The yield of benzoyl-guanylurea formate was 43 g. or 85.5% of theoretical. Decomposition occurred at 133-135° C.

For conversion to the free base, 25.2 g. (0.10 mol) of the salt was dissolved in a warmed mixture of 250 cc. of water and 200 cc. of Cellosolve. The solution was cooled in an ice bath, excess ammonia water was added, followed by the addition of ice. The solid which separated was filtered, washed with water, a little acetone, and allowed to dry. The yield of benzoyl-guanylurea was 13.5 g. or 65.5% of the theory. The material melted with decomposition at 187-188° C. when heated.

We claim:

1. As new compounds acylated guanylureas having the general formula R·Y, in which R is an aromatic radical and Y is an acyl-guanylurea radical which in one of its tautomeric forms has the formula

2. Benzoyl-guanylurea.

3. p-Aminobenzoyl-guanylurea.

4. A method of preparing acylated guanylureas having the general formula R·Y, in which R is an aliphatic radical having at least 3 carbon atoms, and Y is an acyl-guanylurea radical which in one of its tautomeric forms has the formula

which comprises mixing together an aliphatic acylated dicyandiamide, in which the aliphatic group contains at least 3 carbon atoms, water and an acid having a dissociation constant of at least $1 \times 10^{-4}$ and allowing the said substances to remain in contact with each other until an aliphatic acylated guanylurea has been formed.

5. A method of preparing acylated guanylureas having the general formula R·Y, in which R is an aromatic radical and Y is an acyl-guanylurea radical which in one of its tautomeric forms has the formula

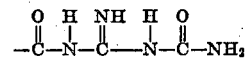

which comprises mixing together an aromatic acylated dicyandiamide, water and an acid having a dissociation constant of at least $1 \times 10^{-4}$ and allowing the said substances to remain in contact with each other until an aromatic acylated guanylurea has been formed.

6. A method of preparing benzoyl-guanylurea which comprises mixing together benzoyldicyandiamide, water and an acid having a dissociation constant of at least $1 \times 10^{-4}$ and allowing the said substances to remain in contact with each other until benzoyl-guanylurea has been formed.

7. A method of preparing caproyl-guanylurea which comprises mixing together caproyldicyandiamide, water and an acid having a dissociation constant of at least $1 \times 10^{-4}$ and allowing the said substances to remain in contact with each other until caproyl-guanylurea has been formed.

8. A method of preparing acylated guanylureas having the general formula R·Y, in which R is a member of the group consisting of aliphatic, alicyclic and aromatic radicals having at least 3 carbon atoms, Y is an acyl-guanylurea radical which in one of its tautomeric forms has the formula

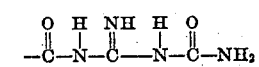

which comprises mixing together an acylated dicyandiamide of the group consisting of aliphatic, alicyclic and aromatic acyl dicyandiamides, water and an acid having a dissociation constant of at least $1 \times 10^{-4}$ and allowing the said substances to remain in contact with each other until an acylated guanylurea has been formed.

9. A method of preparing acylated guanylureas having the general formula R·Y, in which R is a member of the group consisting of aliphatic, alicyclic and aromatic radicals having at least 3 carbon atoms, and Y is an acyl-guanylurea radical which in one of its tautomeric forms has the formula

which comprises mixing together water and a water miscible organic solvent, an acylated dicyandiamide of the group consisting of aliphatic, alicyclic and aromatic acyl dicyandiamides and a slight molecular excess of an acid having a dissociation constant of at least $1 \times 10^{-4}$ and allowing the said substances to remain in contact with each other until an acylated guanylurea has been formed.

DONALD W. KAISER.
JACK T. THURSTON.